United States Patent
Arai et al.

(10) Patent No.: US 6,751,401 B1
(45) Date of Patent: Jun. 15, 2004

(54) METHOD AND APPARATUS FOR PRODUCING PROGRAM INFORMATION AND RECEIVING APPARATUS FOR PROCESSING THE INFORMATION IN A BROADCAST SYSTEM

(75) Inventors: Yuko Arai, Tokyo (JP); Takeshi Nagao, Kawaguchi (JP); Kenichi Fujita, Kawasaki (JP); Hiroki Shinohara, Yokohama (JP); Takayuki Suzuki, Tokyo (JP); Aki Nakagawa, Fujisawa (JP); Yoshimasa Goto, Kawasaki (JP); Hiroyuki Nishi, Tokyo (JP); Yasuhiro Nakamura, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/204,168

(22) Filed: Dec. 3, 1998

(30) Foreign Application Priority Data

Dec. 5, 1997  (JP) ................................. 9-352049

(51) Int. Cl.[7] ................. H04N 5/445; H04N 11/00; H04N 9/79; H04N 5/91; H04N 7/00

(52) U.S. Cl. ..................... 386/83; 725/40; 725/43; 725/52; 348/460; 348/907; 386/1; 386/43; 386/83

(58) Field of Search ................. 725/40, 43, 45, 725/52, 58; 348/907, 460; 386/83, 1, 43

(56) References Cited

U.S. PATENT DOCUMENTS

| | | | | |
|---|---|---|---|---|
| 4,736,407 A | * | 4/1988 | Dumas | 379/96 |
| 5,485,219 A | * | 1/1996 | Woo | 348/460 |
| 5,589,892 A | * | 12/1996 | Knee et al. | 348/731 |
| 5,623,613 A | | 4/1997 | Matthews, III et al. | |
| 5,686,954 A | * | 11/1997 | Yoshinobu et al. | 348/13 |
| 5,731,844 A | * | 3/1998 | Rauch et al. | 348/563 |
| 5,734,444 A | * | 3/1998 | Yoshinobu | 725/14 |
| 5,799,127 A | * | 8/1998 | Kodama | 386/46 |
| 5,809,204 A | * | 9/1998 | Young et al. | 386/83 |
| 5,844,620 A | * | 12/1998 | Coleman et al. | 348/61 |
| 5,880,768 A | * | 3/1999 | Lemmons et al. | 348/1 |
| 5,903,407 A | * | 5/1999 | Tsai | 360/72.1 |
| 5,907,323 A | * | 5/1999 | Lawler et al. | 345/327 |
| 5,940,073 A | * | 8/1999 | Klosterman et al. | 345/327 |
| 5,959,621 A | * | 9/1999 | Nawaz et al. | 345/329 |
| 6,034,677 A | * | 3/2000 | Noguchi et al. | 345/327 |
| 6,064,792 A | * | 5/2000 | Fox et al. | 386/46 |
| 6,091,883 A | * | 7/2000 | Artigalas et al. | 386/83 |
| 6,177,931 B1 | * | 1/2001 | Alexander et al. | 345/327 |
| 6,219,837 B1 | * | 4/2001 | Yeo et al. | 725/38 |
| 6,240,239 B1 | * | 5/2001 | Yu | 386/83 |
| 6,240,240 B1 | * | 5/2001 | Nagano et al. | 386/83 |
| 6,243,145 B1 | * | 6/2001 | Schlarb et al. | 348/906 |

(List continued on next page.)

FOREIGN PATENT DOCUMENTS

| | | |
|---|---|---|
| WO | WO 94 14282 A | 6/1994 |
| WO | WO 94 14284 A | 6/1994 |
| WO | WO 94 19881 A | 9/1994 |

*Primary Examiner*—Victor R. Kostak
*Assistant Examiner*—Son P. Huynh
(74) *Attorney, Agent, or Firm*—Lowe Hauptman Gilman & Berner, LLP

(57) ABSTRACT

A program information producing apparatus broadcasts program information of a next program belonging to the same program group as a subjective program in addition to the program information of the subjective program. A broadcast receiving apparatus displays the program information of the next program based on the received program information of the subjective program, thereby allowing a viewer to make a reservation of the next program after checking its content during the user viewing each event of a series of programs.

2 Claims, 17 Drawing Sheets

U.S. PATENT DOCUMENTS

| | | | |
|---|---|---|---|
| 6,263,501 B1 * | 7/2001 | Schein et al. | 725/39 |
| 6,268,849 B1 * | 7/2001 | Boyer et al. | 345/327 |
| 6,298,482 B1 * | 10/2001 | Seidman et al. | 725/101 |
| 6,323,908 B1 * | 11/2001 | Kida et al. | 348/460 |
| 6,367,078 B1 * | 4/2002 | Lasky | 725/52 |
| 6,400,406 B1 * | 6/2002 | Kim | 348/460 |
| 6,408,435 B1 * | 6/2002 | Sato | 725/58 |
| 6,408,437 B1 * | 6/2002 | Hendricks et al. | 725/132 |
| 6,460,018 B1 * | 10/2002 | Kasai et al. | 705/8 |
| 6,614,987 B1 * | 9/2003 | Ismail et al. | 386/83 |

* cited by examiner

FIG. 2

EVENT INFORMATION TABLE

| EVENT 11 |
| --- |
| NAME : PROGRAM 11<br>SERIES ID : 1<br><br>NEXT EVENT :<br>  EVENT 12<br>  NAME : PROGRAM 12<br>  START/END TIME<br>  RESERVATION NO. : 12<br>  ⋮ |

FIG. 3

EVENT INFORMATION TABLE

| EVENT 11 |
| --- |
| NAME : PROGRAM 11<br>SERIES ID : 1<br>ATTRIBUTE : 1 |

| EVENT 12 |
| --- |
| NAME : PROGRAM 12<br>SERIES ID : 1<br>ATTRIBUTE : 1 |

| EVENT 13 |
| --- |
| NAME : PROGRAM 13<br>SERIES ID : 1<br>ATTRIBUTE : 1 |

| EVENT 21 |
| --- |
| NAME : PROGRAM 21<br>SERIES ID : 2<br>ATTRIBUTE : 2 |

| EVENT 22 |
| --- |
| NAME : PROGRAM 22<br>SERIES ID : 2<br>ATTRIBUTE : 3 |

| EVENT 23 |
| --- |
| NAME : PROGRAM 23<br>SERIES ID : 2<br>ATTRIBUTE : 2 |

FIG. 5

EVENT INFORMATION TABLE

| EVENT 1 |
|---|
| NAME : PROGRAM 1<br>BROADCAST FLAG : 1<br>SPARE FLAG : 1 |
| SPARE EVENT ID=2<br>SPARE EVENT ID=3 |

| EVENT 2 |
|---|
| NAME : PROGRAM 2<br>BROADCAST FLAG : 0<br>SPARE FLAG : 2 |

| EVENT 3 |
|---|
| NAME : PROGRAM 3<br>BROADCAST FLAG : 0<br>SPARE FLAG : 2 |

FIG. 6

EVENT INFORMATION TABLE

| EVENT 1 |
|---|
| NAME : PROGRAM 1<br>BROADCAST FLAG : 0<br>SPARE FLAG : 1 |
| SPARE EVENT ID=2<br>SPARE EVENT ID=3 |

| EVENT 2 |
|---|
| NAME : PROGRAM 2<br>BROADCAST FLAG : 1<br>SPARE FLAG : 2 |

| EVENT 3 |
|---|
| NAME : PROGRAM 3<br>BROADCAST FLAG : 1<br>SPARE FLAG : 2 |

FIG. 7

| | PROGRAM TABLE | | | |
|---|---|---|---|---|
| | CHANNEL 1 | | CHANNEL 2 | ... |
| | MAIN | SPARE | | |
| 19 | BASEBALL TELECAST | VARIETY | · | |
| 20 | | TRAVEL | · | |
| 21 | DRAMA "A" | | · | |
| 22 | | | | |

RESERVATION

FIG. 8

| | PROGRAM TABLE | | |
|---|---|---|---|
| | CHANNEL 1 | CHANNEL 2 | ... |
| | MAIN | | |
| 19 | VARIETY | · | |
| 20 | TRAVEL | · | |
| 21 | DRAMA "A" | · | |
| 22 | | | |

RESERVATION

FIG. 9

MESSAGE

10/1
CANCELED RESERVATION IS
BASEBALL TELECAST FROM
19:00 TO 21:00

OK

EVENT INFORMATION TABLE

| EVENT 11 |
|---|
| ⟨LINKED TO⟩<br>SERVICE ID : 1<br>EVENT ID : 111 |
| ⟨REQUIREMENTS⟩<br>NAME : PROGRAM 11<br>AGE LIMIT : 18<br>PPV FLAG : 1<br>CONTRACT TYPE : 2<br>PRICE : 2000 |

| EVENT 111 |
|---|
| ⟨LINKED TO⟩<br>SERVICE ID : 2<br>EVENT ID : 11 |

SERVICE INFORMATION TABLE

NEWS CHANNEL PROGRAM TABLE (TEMPLATE 1)

(a)

| | TITLE | CONTENTS |
|---|---|---|
| 7 | 7AM NEWS<br>CASTER : YAMADA | 07:10 TOPICS<br>07:15 WEATHER<br>07:23 LOCAL NEWS |
| 8 | . | . |
| ⋮ | . | . |
| 22 | | |
| 23 | | |

SONG CHANNEL PROGRAM TABLE (TEMPLATE 2)

(b)

| 8<br>9 | SONG BATTLE SHOW | SINGERS |
| 10<br>15 | - - - | SINGERS |

FIG. 17

SERVICE INFORMATION TABLE

| SERVICE 11 |
|---|
| NETWORK ID : 1 |
| SERVICE ID : 11 |
| NAME : CHANNEL 11 |
| REGION ID : 2 |

| SERVICE 21 |
|---|
| NETWORK ID : 2 |
| SERVICE ID : 21 |
| NAME : CHANNEL 21 |
| REGION ID : 2 |

FIG. 18

| BS CHANNELS | | TERRESTRIAL TV CHANNELS | |
|---|---|---|---|
| 101 | 102 | 8 | 10 |
|  |  |  |  |
|  |  |  |  |
|  |  |  |  |
|  |  |  |  |
|  |  |  |  |

| SERVICE TABLE | SELECT |
|---|---|
| BS : CHANNEL 11 | |
| : CHANNEL12 | |
| TERRESTRIAL : CHANNEL 21 | |
| : CHANNEL 22 | |

(b)

| PROGRAM TABLE | SELECT |
|---|---|
| 8:00~9:00 | ○×△ |
| 9:00~12:00 | NEWS |
| 12:00~13:30 | |

(c)

| PROGRAM DISPLAY | UPDATE |
|---|---|
| NAME : | SPORTS RELAY |
| START/END : | 15:00 ~ 17:00 |
| PRIORITY : | 2 |
| EXPLANATION : | |

METHOD AND APPARATUS FOR PRODUCING PROGRAM INFORMATION AND RECEIVING APPARATUS FOR PROCESSING THE INFORMATION IN A BROADCAST SYSTEM

BACKGROUND OF THE INVENTION

The present invention relates to a broadcast system for broadcasting additional or supplemental program information multiplexed with main program information including video and audio data, and also related to apparatuses used in a broadcast station or a receiver apparatus using the program information. More specifically, the present invention utilizes the additional or supplemental program information to realize various types of program recording or reservation services and program table displays.

Starting a prototype digital satellite broadcast service from the year 2,000 is a goal to be attained for the broadcast industries or enterprisers in Japan. To this end, digitized broadcasting and related techniques have been steadily developed. The European standardizing organization has already decided to adopt a digital broadcast standard DVB (digital video broadcasting) that uses the MPEG2 technique for coding and/or multiplexing video and audio data. And, the digital satellite broadcast service conforming to this standard actually started from the year 1,995.

SUMMARY OF THE INVENTION

An object of the present invention is to provide a broadcast system which transmits improved program information data and provides an improved display of the program table so as to allow users to make a reservation for a target program in various ways. Furthermore, the present invention has an object to provide improved arrangement for the apparatuses constituting this broadcast system.

In order to accomplish the above-described and other related objects, in a broadcast system of the present invention, a broadcast station produces program information including information of a next program in a series of programs, or program information of a main program and its spare program scheduled in a same time slot, or program information linking two programs, or program information designating a preferable display format of a program table, or program information including regional information. A receiving apparatus allows a sequential reservation for series programs or a reservation for a spare program, and automatically switches a program to a linked program when the view requirements are not fulfilled, and displays a characteristic program table or a local program table, and performs a bandwidth adjustment in accordance with a priority order when the broadcast station puts the priority order to each program information.

One aspect of the present invention provides a broadcast system for broadcasting a program and related program information, comprising a program information producing apparatus for broadcasting program information of a subjective program of a program group, the program information of the subjective program including program information of other program belonging to the same program group, and a broadcast receiving apparatus for receiving the program information of the subjective program and displaying the subjective program together with the program information of other program belonging to the same program group. This arrangement allows the users to confirm the content of a program to be broadcasted next time in a series of programs.

Another aspect of the present invention provides a program information producing and transmitting method for a program information producing apparatus. This method comprises a step of producing program information of a subjective program of a program group, the program information of the subjective program including program information of other program belonging to the same program group, and a step of transmitting the subjective program and the produced program information of the subjective program. This method allows the users to confirm the content of a program to be broadcasted next time in a series of programs.

Another aspect of the present invention provides a broadcast system for broadcasting a program and related program information, comprising a program information producing apparatus for broadcasting program information of a subjective program of a program group, the program information of the subjective program including program information of a next program to be broadcasted next time and belonging to the same program group, and a broadcast receiving apparatus for receiving the program information of the subjective program sent from the program information producing apparatus and displaying the subjective program together with the program information of the next program based on the received program information of the subjective program, thereby allowing a viewer to make a reservation of the next program. This arrangement allows the users to confirm the content of the next program to be broadcasted next time in a series of programs and also allows the users to make a reservation of the next program.

Another aspect of the present invention provides a program information producing apparatus for a broadcast system broadcasting a program and related program information. This apparatus comprises a program group information producing means for producing program information of a subjective program of a program group, the program information of the subjective program including program information of a next program to be broadcasted next time and belonging to the same program group, and a transmitting means for transmitting the subjective program and the program information produced by the program group information producing means.

Another aspect of the present invention provides a program information producing and transmitting method for a program information producing apparatus. This method comprises a step of producing program information of a subjective program of a program group, the program information of the subjective program including program information of a next program to be broadcasted next time and belonging to the same program group, and a step of transmitting the subjective program and the produced program information of the subjective program.

Another aspect of the present invention provides a receiving apparatus for a broadcast system, wherein the receiving apparatus receives program information multiplexed with video and audio data, and the receiving apparatus updates the tuning processing in accordance with the received program information. With this arrangement, the tuning processing of the receiving apparatus can be updated in accordance with the received program information.

Another aspect of the present invention provides a receiving apparatus for a broadcast system, wherein the receiving apparatus receives program information multiplexed with video and audio data, and the receiving apparatus updates recording processing in accordance with the received program information. With this arrangement, the recording processing of the receiving apparatus can be updated in accordance with the received program information.

Another aspect of the present invention provides a receiving apparatus for receiving program information, comprising a program group information managing means for reading program information of a next program to be broadcasted next time from program information of a subjective program of a program group, and displaying the read program information of the next program together with the subjective program, and a reserving means for performing reservation processing in response to a user's operation for making a reservation for the next program.

Another aspect of the present invention provides a broadcast system for broadcasting a program and related program information, comprising a program information producing apparatus for broadcasting program information of a program of a program group, the program information including the attribute designating a recording method of a program belonging to the same program group, and a broadcast receiving apparatus for receiving the program information produced by the program information producing apparatus and performing the recording of the program in accordance with the designated recording method. For example, when a series of news programs are broadcasted, it becomes possible to record only the latest program in a substitute manner.

Another aspect of the present invention provides a program information producing and transmitting method for a program information producing apparatus. This method comprises a step of producing program information of a program of a program group, the program information including designation of a recording method of a program belonging to the same program group, and a step of transmitting the produced program information including the designation of the recording method.

Another aspect of the present invention provides a broadcast system for broadcasting a program and related program information, comprising a program information producing apparatus for broadcasting program information of a program of a program group, the program information including the attribute designating a reservation method of a program belonging to the same program group, and a broadcast receiving apparatus for receiving the program information produced by the program information producing apparatus and performing the reservation of the program in accordance with the designated reservation method. For example, it become possible for the users to make a reservation of a sports relay broadcasting, while canceling a related sport news program broadcasting the digest of the sports events.

Another aspect of the present invention provides a program information producing and transmitting method for a program information producing apparatus. This method comprises a step of producing program information of a program of a program group, the program information including designation of a reservation method of a program belonging to the same program group, and a step of transmitting the produced program information including the designation of the reservation method.

Another aspect of the present invention provides a program information producing apparatus for a broadcast system broadcasting a program and related program information. This apparatus comprises a program group information producing means for producing program information of a program of a program group, the program information including the attribute designating a recording method of a program belonging to the same program group, and a transmitting means for transmitting the program information produced by the program group information producing means.

Another aspect of the present invention provides a program information producing apparatus for a broadcast system broadcasting a program and related program information. This apparatus comprises a program group information producing means for producing program information of a program of a program group, the program information including the attribute designating a reservation method of a program belonging to the same program group, and a transmitting means for transmitting the program information produced by the program group information producing means.

Another aspect of the present invention provides a receiving apparatus for receiving program information, comprising a reserving means for receiving program information of a program of a program group and performing reservation processing of a program in the same program group in accordance with the attribute involved in the received program information.

Another aspect of the present invention provides a broadcast system for broadcasting a program and related program information, comprising a program information producing apparatus for broadcasting program information of a subjective program of a program group, the program information of the subjective program including information of a spare program as to whether the spare program will be broadcasted or not, and a broadcast receiving apparatus for receiving the program information of the subjective program sent from the program information producing apparatus and displaying the spare program on a program table based on the received program information, thereby allowing a viewer to make a reservation of the spare program. With this arrangement, the user can make a reservation of a program whose broadcasting is uncertain.

Another aspect of the present invention provides a program information producing apparatus for a broadcast system broadcasting a program and related program information. This apparatus comprises a spare program information producing means for producing program information including a flag indicating as to whether a spare program will be broadcasted or not, and transmitting means for transmitting the program information produced by the spare program information producing means.

Another aspect of the present invention provides a program information producing and transmitting method for a program information producing apparatus. This method comprises a step of producing program information of spare programs scheduled in a same broadcast time slot as to whether each of the space programs will be broadcasted or not, and a step of transmitting the produced program information of the spare programs.

Another aspect of the present invention provides a receiving apparatus for receiving program information, comprising a spare program managing means for producing a program table including a spare program based on program information of the spare program, and a reserving means for performing reservation processing in response to a user's operation for making a reservation of the spare program.

Another aspect of the present invention provides the receiving apparatus, wherein the reserving means is for notifying the user of failure of the reservation when the broadcasting of the spare program is canceled. With this arrangement, the user can know the failure of the reservation.

Another aspect of the present invention provides a broadcast system for broadcasting program information, comprising a program information producing apparatus for broadcasting a subjective program with viewing requirements and a related promotion program scheduled in a same time slot, and producing and broadcasting program information for each of the subjective and promotion programs so as to include linking information for correlating the subjective and promotion programs, and a broadcast receiving apparatus for canceling a display of the subjective program when the viewing requirements are not fulfilled and replacing the display of the subjective program by a display of the promotion program linked to the subjective program. This system prevents the uncomfortable blackout from appearing on the TV monitor screen when a program is selected without fulfilling the viewing requirements.

Another aspect of the present invention provides the broadcast system, wherein the broadcast receiving apparatus switches the display of the promotion program to the display of the subjective program upon fulfillment of the viewing requirements. The system allows the user to check the content of the program by the promotion program before purchasing this program. The user can watch the purchased program upon completion of the necessary operation.

Another aspect of the present invention provides a program information producing apparatus for a broadcast system broadcasting program information. This apparatus comprises a link information producing means for producing program information of each of a subjective program with viewing requirements and a related promotion program scheduled in a same time slot, the program information of the subjective and promotion programs including linking information for correlating the subjective program with the related promotion program, and a transmitting means for transmitting the program information produced by the link information producing means.

Another aspect of the present invention provides a program information producing and transmitting method for a program information producing apparatus. This method comprises a step of producing program information of each of a subjective program with viewing requirements and a related promotion program scheduled in a same time slot, the program information of the subjective and promotion programs including linking information for correlating the subjective program with the related promotion program, and a step of transmitting the program information including the linking information for correlating the subjective program with the related promotion program.

Another aspect of the present invention provides a receiving apparatus for a broadcast system broadcasting program information. This apparatus comprises a requirement managing means for checking whether viewing requirements of a subjective program are fulfilled or not when a display of the subjective program is requested, a link information managing means for searching a program linked to the subjective program based on program information of the subjective program when any unfulfilled viewing requirement is confirmed by the requirement managing means, and a display control means for displaying the linked program searched by the link information managing means.

Another aspect of the present invention provides a broadcast system for broadcasting program information, comprising a program information producing apparatus for broadcasting program information including designation of a display format of a program table, and a broadcast receiving apparatus storing a plurality of display formats for selecting a suitable format among the plurality of display formats in accordance with the designation of the program information producing apparatus, thereby displaying the program table by using the designated display format. With this system, it becomes possible to display a characteristic or unique program table.

Another aspect of the present invention provides a program information producing apparatus for a broadcast system broadcasting program information. This apparatus comprises a template information producing means for producing program information including designation of a display format of a program table, and a transmitting means for transmitting the program information produced by the template information producing means.

Another aspect of the present invention provides a program information producing and transmitting method for a program information producing apparatus. This method comprises a step of producing program information including designation of a display format of a program table, and a step of transmitting the program information including the designation of the display format of the program table.

Another aspect of the present invention provides the program information producing apparatus, wherein the template information producing means is for producing a new display format and the transmitting means is for transmitting the produced new display format to a broadcast receiving apparatus. This arrangement makes it possible to add and/or modify the display format stored in the receiving apparatus.

Another aspect of the present invention provides a program information producing and transmitting method for a program information producing apparatus. This method comprises a step of producing a new display format, and a step of transmitting the produced new display format.

Another aspect of the present invention provides a receiving apparatus for a broadcast system broadcasting program information. This apparatus comprises a template information managing means storing a plurality of display formats for selecting a suitable format among the plurality of display formats in accordance with designation involved in program information, thereby producing a program table by using the designated display format.

Another aspect of the present invention provides a broadcast system for broadcasting program information, comprising a program information producing apparatus for broadcasting program information relating to program tables for all regions, the program information including information indicating respective regions, and a broadcast receiving apparatus for selectively displaying a local program table corresponding to a designated region. With this arrangement, the receiving apparatus can display a local program table listing the programs receivable in this region.

Another aspect of the present invention provides a program information producing apparatus for a broadcast system broadcasting program information. This apparatus comprises a local program information producing means for producing program information relating to program tables for all regions, the program information including information indicating respective regions, and a transmitting means for transmitting the program information produced by the local program information producing means.

Another aspect of the present invention provides a program information producing and transmitting method for a program information producing apparatus. The method comprises a step of producing program information relating to program tables for all regions, the program information including information indicating respective regions, and a step of transmitting the produced program information including the program tables for all regions and the information indicating respective regions.

Another aspect of the present invention provides a receiving apparatus for receiving program information, comprising a local program information managing means for selecting program information corresponding to a designated region from program information of a plurality of regions, producing a local program table based on the selected program information, and displaying the produced local program table.

Another aspect of the present invention provides a program information producing apparatus for a broadcast system broadcasting program information. This apparatus comprises a means for putting a priority order to program information, and a means for eliminating supplemental information involved in the program information when the program information has a lower priority order, thereby performing a bandwidth adjustment. Thus, when the bans adjustment is required, the supplemental information of the low-priority program is eliminated.

Another aspect of the present invention provides a program information producing and transmitting method for a program information producing apparatus. This method comprises a step of putting a priority order to program information, a step of eliminating supplemental information involved in the program information when the program information has a lower priority order, thereby performing a bandwidth adjustment, and a step of transmitting the bandwidth adjusted program information.

Another aspect of the present invention provides a program information producing apparatus for a broadcast system broadcasting program information. The apparatus comprises a means for putting a priority order to program information, and a means for shortening a listing duration of a specific program on a program table when the specific program information has a lower priority order, thereby performing a bandwidth adjustment. Thus, when the bans adjustment is required, the listing duration of the low-priority program is reduced.

Another aspect of the present invention provides a program information transmitting method for a program information producing apparatus, comprising a step of putting a priority order to program information, and a step of shortening a listing duration of a specific program on a program table when the specific program information has a lower priority order, thereby performing a bandwidth adjustment.

Another aspect of the present invention provides a program information producing apparatus for a broadcast system broadcasting program information. This apparatus comprises a means for putting a priority order to program information, and a means for changing a transmission method of the program information in accordance with the priority order.

Another aspect of the present invention provides a program information transmitting method for a program information producing apparatus. This method comprises a step of putting a priority order to program information, and a step of transmitting program information whose transmission method is changed in accordance with the priority order.

Another aspect of the present invention provides the program information transmitting method, wherein a transmitting cycle is reduced when the program information has a lower priority order, while the transmitting cycle is increased when the program information has a higher priority order. This arrangement makes it possible for the receiving apparatus to display the low-priority program information at a low frequency and display the high-priority program information at a high frequency.

Another aspect of the present invention provides a program information transmitting method for a program information producing apparatus, comprising a step of checking a priority order of program information, and a step of reducing a transmitting cycle of the program information when the program information has a lower priority order and increasing the transmitting cycle of the program information when the program information has a higher priority order.

Another aspect of the present invention provides a program information producing apparatus for a broadcast system broadcasting program information. This apparatus comprises a program information producing means for producing program information having a priority order, and a priority order processing means for changing a content or a transmission method of the program information in accordance with the priority order of the program information.

Another aspect of the present invention provides a program information transmitting method for a program information producing apparatus. This method comprises a step of putting a priority order to program information, and a step of transmitting the program information whose content or transmission method is changed in accordance with the priority order of the program information.

BRIEF DESCRIPTION OF THE DRAWINGS

The above and other objects, features and advantages of the present invention will become more apparent from the following detailed description which is to be read in conjunction with the accompanying drawings, in which:

FIG. 2 is a view showing an event information table used in the broadcast system in accordance with the first embodiment of the present invention:

FIG. 3 is a view showing another event information tables used in the broadcast system in accordance with the first embodiment of the present invention;

FIG. 5 is a view showing an event information table used in the broadcast system in accordance with the second embodiment of the present invention;

FIG. 6 is a view showing the event information tables whose schedule is modified in accordance with the second embodiment of the present invention;

FIG. 7 is a view showing a program table used for displaying spare programs in the broadcast system in accordance with the second embodiment of the present invention;

FIG. 8 is a view showing the program table whose schedule is modified in accordance with the second embodiment of the present invention;

FIG. 9 is a screen display indicating the cancellation of a scheduled broadcasting used in the broadcast system in accordance with the second embodiment of the present invention;

FIG. 17 is a view showing a service information table used in the broadcast system in accordance with the fifth embodiment of the present invention;

FIG. 18 is a view showing a program table used in the broadcast system in accordance with the fifth embodiment of the present invention;

FIG. 20 is a view showing a screen used in the priority order changing procedure performed in the broadcast system in accordance with the sixth embodiment of the present invention;

DESCRIPTION OF THE PREFERRED EMBODIMENTS

Preferable embodiments of the present invention will be explained in detail with reference to attached drawings.

Digital Satellite Broadcast System

Figure 24:
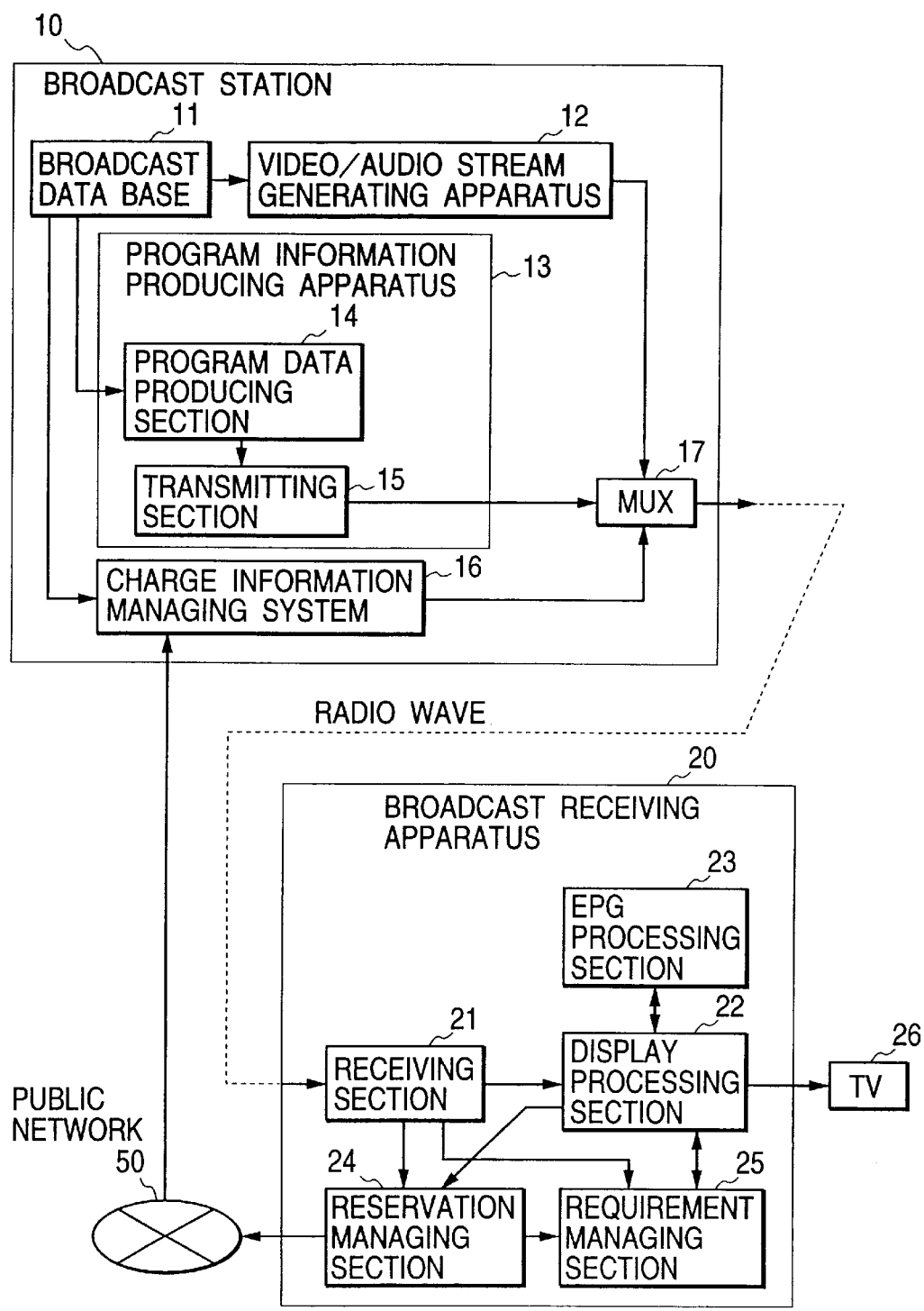
FIG. 24 is a block diagram schematically showing a fundamental arrangement of a broadcast system.

FIG. 24 shows a fundamental arrangement of a digital satellite broadcast system. In a broadcast station 10, a broadcast data base 11 stores main program information and program scheduling information. A video/audio stream generating apparatus 12 generates a data stream of the main program information. A program information producing apparatus 13 produces program information. A charge information managing system 16 manages charge information relating to the viewing of programs. A multiplexing apparatus (MUX) 17 transmits a transport stream (TS) of multiplexed data including the data stream of the main program information, the program information produced by the program information producing apparatus 13, and the charge information. In the program information producing apparatus 13, a program data producing section 14 produces program information based on the program scheduling information obtained from the broadcast data base 11. A transmitting section 15 repetitively transmits the program information produced by the program data producing section 14.

In a broadcast receiving apparatus 20, a receiving section 21 receives a TS signal sent from the broadcast station 10 and demodulates the received TS signal. A display processing section 22 decodes the video and audio data and the program information involved in the received TS signal. An EPG (electronic program guide) processing section 23 produces a program table to be displayed based on the decoded program information. A reservation managing section 24 manages the display or recording of a reserved program in response to a user's operation and transmits the information relating to all of purchased PPV (pay per view) programs via a public network 50 to the charge information managing system 16 in the broadcast station 10. A requirement managing section 25 checks whether the viewing requirements of a program are fulfilled or not when the viewing of this program is requested. A display section (TV) 26 displays the video with the sounds.

Figure 25:
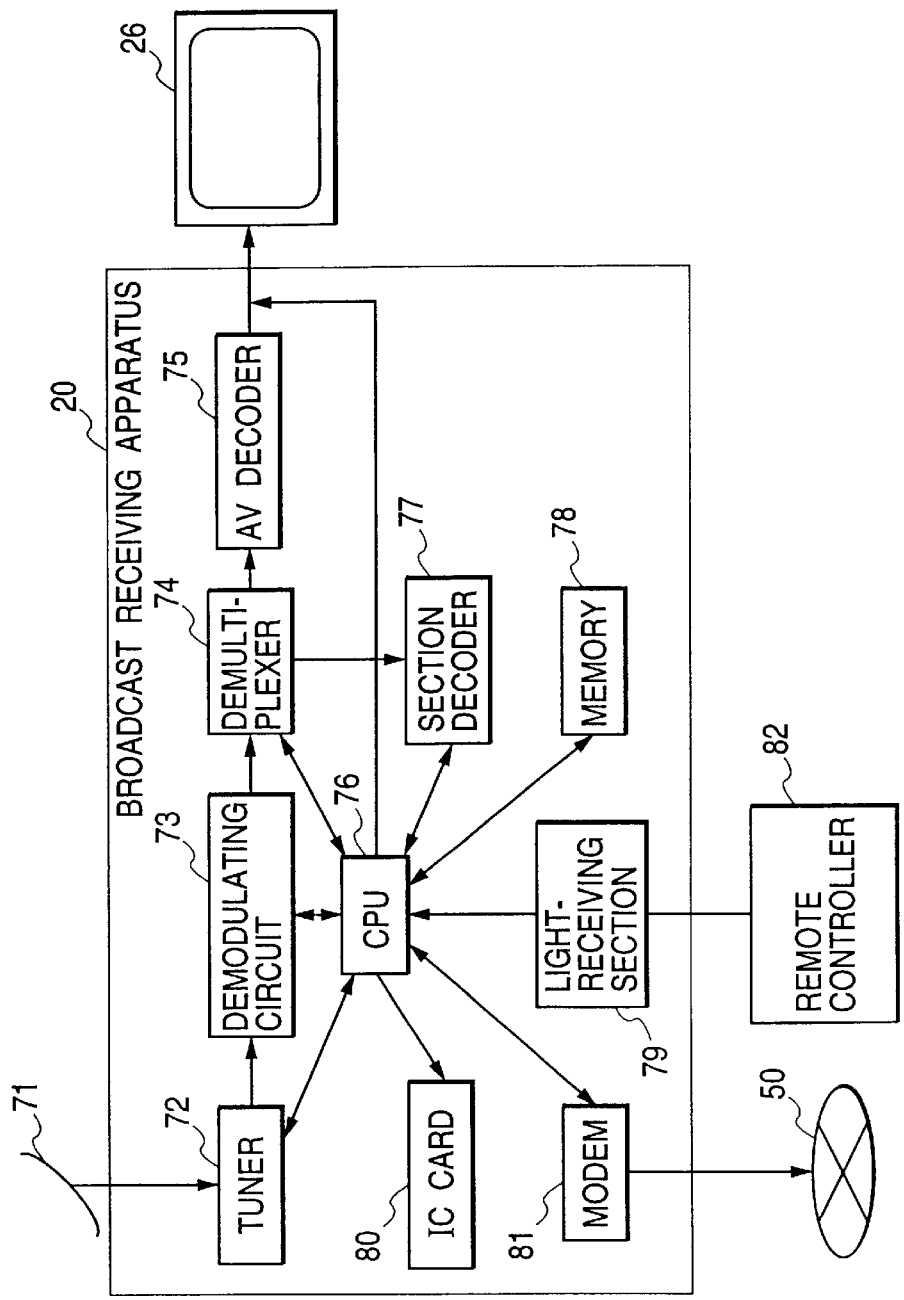
FIG. 25 is a block diagram schematically showing a hardware arrangement of a receiving apparatus of the broadcast system shown in FIG. 24.

FIG. 25 is a schematic view showing a hardware arrangement of the broadcast receiving apparatus 20. A tuner 72 tunes in to the signal received by an antenna. A demodulating circuit 73 demodulates the tuned signal. The tuner 72, the demodulating circuit 73, a CPU 76, and a memory 78 cooperatively function as the receiving section 21 shown in FIG. 24. A demultiplexer 74 separates the demodulated signal into video and audio data and program information data. An AV decoder 75 decodes the video and audio data. A section decoder 77 decodes the program information data. A light receiving section 79 receives a command sent from a remote controller 82. The demultiplexer 74, the AV decoder 75, the section decoder 77, the light receiving section 79, the CPU 76 and the memory 78 cooperatively function as the display processing section 22 shown in FIG. 24. The CPU 76 and the memory 78 cooperatively function as the EPG processing section 23. An IC card 80 memorizes the data relating to purchased programs. A modem 81 performs data communication via the public network 50. The IC card 80, the modem 81, the CPU 76 and the memory 78 cooperatively function as the requirement managing section 25 shown in FIG. 24.

According to the above-described broadcast station 10, the program data producing section 14 of the program information producing apparatus 13 produces the program information data based on the program scheduling information obtained from the broadcast data base 11 and sends the produced program information data to the transmitting section 15. The produced program information data may contain network (i.e., an assembly of a plurality of transponders) related information including the tuning to the TS signal, service (i.e., channel) related information including service ID, service name, service type etc., and event (i.e., program) related information including program ID, program name, program start time, program length, etc. The transmitting section 15 divides the program information data into MPEG2 TS packets which are multiplexible in the MUX 17. The MPEG2 TS packets are repetitively transmitted from the transmitting section 15 to the MUX 17.

The MUX 17 multiplexes the program information data sent from the transmitting section 15 with the data stream of the main program information produced from the video/ audio stream generating apparatus 12 and the charge information sent from the charge information managing system 16, thereby producing a multiplexed TS signal which is broadcasted via a transponder.

The program information including the same content is repetitively broadcasted. A version number is allocated to each transmitting unit of the program information. The version number is incremented upon updating the contents of the program information. The broadcast receiving apparatus 20 receives the broadcasted program information, and stores the latest program information in the memory with reference to its version number. To this end, the broadcast receiving apparatus 20 always monitors the program information to update the stored data in response to the increment of the version number, or acquires the program information only when it is needed, or receives the program information periodically (e.g., once a day).

The broadcasting radio wave including the program information is demodulated in the receiving section 21, and decoded in the display processing section 22. Referring to the version number, the display processing section 22 stores the latest program information.

The EPG processing section 23 accesses network information involved in the program information stored in the memory to obtain a list of service numbers of all services (channels) available through the network. Then, the EPG processing section 23 obtains the service related information, such as service ID and service name, and the event related information, such as program schedule, from the program information.

The program table is processed in the display processing section 22 in accordance with the user's request and is displayed on the TV monitor 26.

When the user selects a program from the program table displayed on the screen of TV monitor 26 to make a reservation of viewing and/or recoding, the reservation is notified to the reservation managing section 24 through the display processing section 22. The reservation managing section 24 manages the program ID and the reservation time to start the display and/or recording of the reserved program when the reservation time comes, and also notifies the requirement managing section 25 of the completion of reservation procedure. Furthermore, when any PPV program is reserved, the reservation managing section 24 memorizes the purchased PPV program and sends the related charge information to the charge information managing system 16 in the broadcast station 10 via the public network 50.

The requirement managing section 25 checks whether the viewing requirements of the reserved program are fulfilled or not. More specifically, when the viewing of this program is requested, the requirement managing section 25 compares the viewing conditions, such as age requirement and price requirement (charged/free), with the user's age registered in the broadcast receiving apparatus 20 and the reserved contents notified from the reservation managing section 24. Thus, the viewing of the reserved program is allowed only when all of the viewing conditions are fulfilled.

Furthermore, when the viewer selects a channel (i.e., designates a service number) to watch a program currently on air, the receiving section 21 accesses the network information involved in the program information stored in the memory to obtain both TS-ID relating to the selected channel and tuning information for the designated TS. Then, the receiving section 21 tunes in to the designated TS and collects the packets of the selected channel to produce a demodulation signal of the selected channel. When all of the viewing requirements are fulfilled, the display processing section 22 decodes the video and audio signals from the demodulation signal. The decoded video is displayed with sounds through the TV monitor 26.

When the broadcast receiving apparatus 20 has no rights to receive a certain PPV program, a scrambled meaningless video (referred to "blackout") appears on the screen in response to the receiving of this PPV program. At the same time, a message recommending to purchase this PPV program and a price for viewing it are displayed on the screen. If the user operates an input apparatus to purchase this PPV, the scramble guard is removed and the video is clearly displayed on the screen. The purchase data is memorized in the reservation managing section 24. The collected purchase data is sent to the charge information managing system 16 in the broadcast station 10 via the public network 50.

However, the above-described broadcast system has the following matters to be improved.

According to this broadcast system, when a user makes a reservation of a series of programs, such as drama series, the user needs to make a reservation of all of the series programs collectively. It is impossible to makes a reservation of the programs one by one after checking the content of each program broadcasted next time.

Furthermore, it is impossible to make a reservation for viewing and/or recording a program whose broadcasting depends on uncertain conditions, such as weather. For example, a spare program for a sports program will be broadcasted only when this sports event is canceled due to bad weather.

The PPV programs usually provide a preview service for allowing users to watch this program for a few minutes on a free basis. Thus, the users can confirm the content of each PPV program through this preview service before purchasing this PPV program. However, the preview service is not satisfactory to check the program content sufficiently. Furthermore, the blackout suddenly appears on the TV monitor screen upon initiation of the PPV program not purchased. This is uncomfortable for the viewers.

Usually, only one type of program table is displayed. Thus, similar format is used to display the program data of each channel, lacking in variety. It takes a long time to search a target program among numerous programs.

First Embodiment

A first embodiment of the present invention provides a broadcast system allowing users to make a reservation for a series of programs in various ways. In this embodiment, a series of programs include a program group of non-related programs as well as a program group of related programs, such as series drama, animation stories, everyday or periodical news, movies etc, which are scheduled in a predetermined time slot or classified into the same category.

Figure 1:
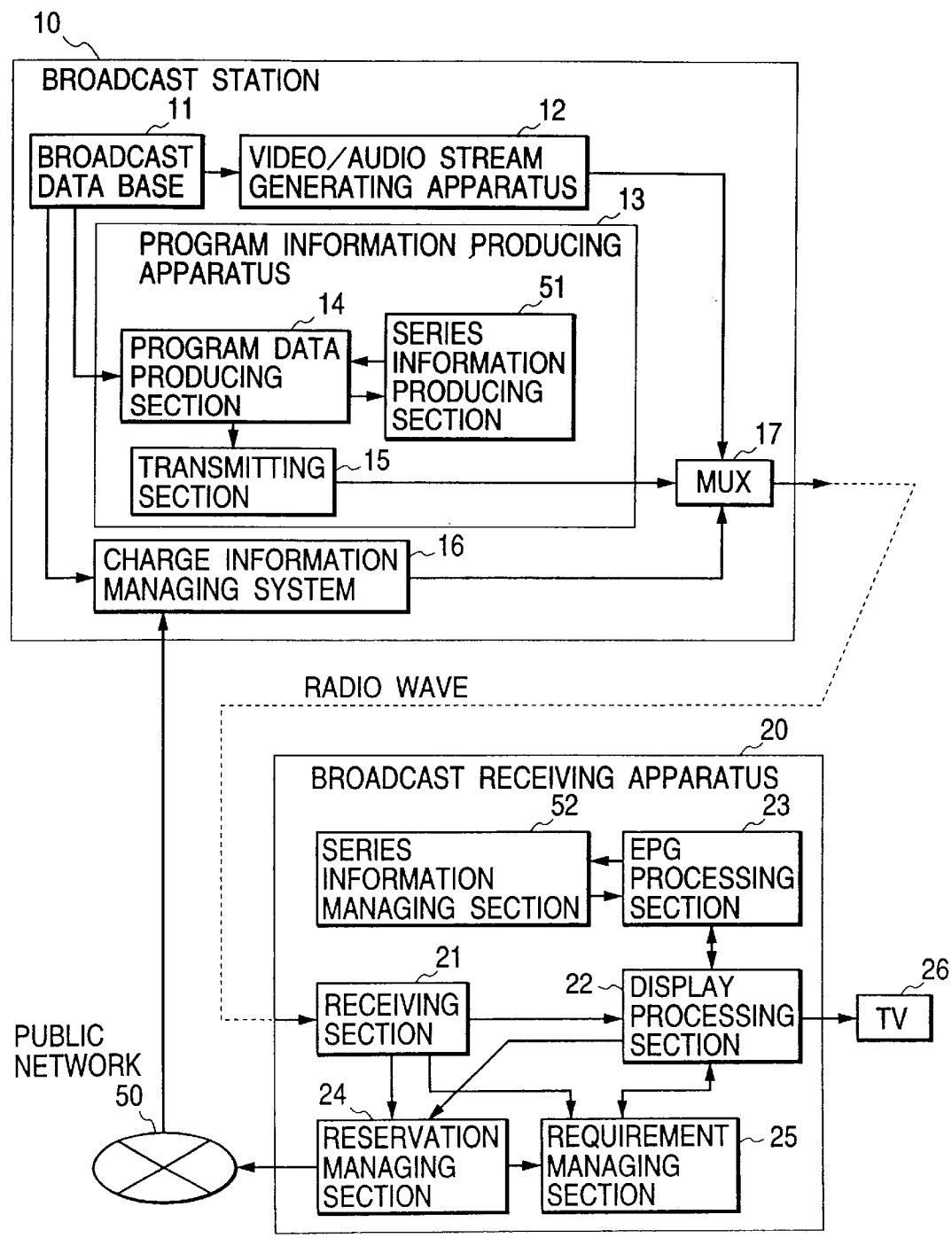
FIG. 1 is a block diagram schematically showing an arrangement of a broadcast system in accordance with a first embodiment of the present invention.

In a broadcast station of this system shown in FIG. 1, a broadcast data base 11 stores main program information and program scheduling information. A video/audio stream generating apparatus 12 generates a data stream of the main program information. A program information producing apparatus 13 produces program information. A charge information managing system 16 manages charge information relating to the viewing of programs. A multiplexing apparatus (MUX) 17 transmits a transport stream (TS) of multiplexed data including the data stream of the main program information, the program information produced by the program information producing apparatus 13, and the charge information. In the program information producing apparatus 13, a program data producing section 14 produces program information based on the program scheduling information obtained from the broadcast data base 11. A series information producing section 51, connected to the program data producing section 14, produces program information of a series of programs. A transmitting section 15 repetitively transmits the program information produced by the program data producing section 14.

In a broadcast receiving apparatus 20, a receiving section 21 receives a TS signal sent from the broadcast station 10 and demodulates the received TS signal. A display processing section 22 decodes the video and audio data and the program information involved in the received TS signal. An EPG processing section 23 produces a program table based on the decoded program information. A series information managing section 52 manages the display of advance notice for a series of programs (i.e., program group). A reservation managing section 24 manages the display or recording of a reserved program in response to a user's operation and transmits the information relating to all of purchased PPV (pay per view) programs via a public network 50 to the charge information managing system 16 in the broadcast station 10. A requirement managing section 25 checks whether the viewing requirements of a program are fulfilled or not when the viewing of this program is requested. A display section (TV monitor) 26 displays the video with the sounds.

The broadcast receiving apparatus 20 has a hardware arrangement substantially identical with that shown in FIG. 25. Like the EPG processing section 23, the CPU 76 and the memory 78 cooperatively function as the series information managing section 52. In other words, the operation of the series information managing section 52 is part of the operation performed by the EPG processing section 23.

The above-described broadcast station 10 and the broadcast receiving apparatus 20 performs the following operation relating to a series of programs in addition to the operation of the above-described fundamental broadcast system.

FIG. 2 shows an event information table of a series of programs produced by the series information producing section 51 of the program information producing apparatus 13 based on the program scheduling information obtained from the broadcast data base 11 in the broadcast station 10.

This event information table, relating to an event 11 being one of a series of programs, contains the data inherent to this event 11, such as program name (program 11) and series ID. Furthermore, this event information table includes the data, such as "program name", "broadcast start time", "broadcast end time", "reservation number" etc. of another event 12 which is the next program of this series.

The transmitting section 15 sends this event information table to the MUX 17. After being multiplexed in the MUX 17, the event information table is transmitted in the form of a TS signal to the broadcast receiving apparatus 20.

The TS signal including the event information table is demodulated in the receiving section 21 and decoded in the display processing section 22. The decoded program information is stored in the memory.

A viewer of the broadcast receiving apparatus 20, watching the event 11, may operate a remote controller to request the notice of the next program belonging the same series. In response to this request, the series information managing section 52 reads the event information table of FIG. 2 from the memory storing the program information relating to the event 11. Then, the information of the next event 12, including the program name, the broadcast start/end time, the content etc., is displayed on the TV monitor 26 to allow the viewer to make a reservation of the next program.

To provide an automatic reservation guide, it is preferable to display a mouse selectable menu by using GUI (graphical user interface) several minutes before the termination of the currently broadcasted program. It is also preferable that the broadcast station 10 transmits a "reservation guide" button through the data transmission in synchronism with the main program of event 11. The user can operate the displayed button to display the reservation guide GUI.

Upon completion of the input procedure for reservation done by the user based on the notice of the next program, the reservation result is sent through the display processing section 22 to the reservation managing section 24. The reservation managing section 24 performs the reservation processing for the event 12 based on the event ID, the start/end time, and reservation number.

As described above, this system allows the user to make a reservation for the next program of the same series after checking the content of the next program each time when the user watches the present program currently on air.

Furthermore, this embodiment can be modified in various manners. For example, it is possible to display the content of the previous program or a plurality of programs in the same series in addition to the content of the next program.

For example, the program information producing apparatus can add the summary of past stories in this series to the program information of the present program transmitted to the broadcast receiving apparatus. The broadcast receiving apparatus can display the summary of the past stories each time a program of this series is broadcasted. Furthermore, when a plurality of sports events constitute a series of programs, it is possible to advertise a major sports event by adding its information to each program of this series, increasing chances for encouraging users to make a reservation for it.

FIG. 3 shows another event information tables of a series of programs produced by the series information producing section 51 of the program information producing apparatus 13 based on the program scheduling information obtained from the broadcast data base 11 in the broadcast station 10. These event information tables include series attributes relating to automatic program tuning (i.e., automatic power-on and turning on time) and automatic recording controls. More specifically, attribute 1 represents an automatic recording for recording a program on a previously recorded program of the same series in a substitute manner. Attribute 2 represents an automatic recording for recording a program independent of the previously recorded program. Attribute 3 represents an automatic tuning with no recording.

The broadcast station 10 defines a series of news programs which are to be broadcasted everyday. The event information table of each news program includes the attribute 1, as shown in the event information tables of events 11, 12 and 13 of FIG. 3. The series information producing section 51 describes the series attribute 1 together with the program name and the series ID in each event information table based on the program scheduling information obtained from the broadcast data base 11.

Furthermore, the series information producing section 51 describes the series attribute 2 together with the program name and the series ID in the event information table of an event when this event relates to a series of drama programs.

Furthermore, it may be possible to define a sports relay broadcasting and a sports news as constituents of a series of sports programs. A user may wants to record the sports relay broadcasting and deny the recording of the sports news to be broadcasted after this sports event. In this case, with reference to the program scheduling information obtained from the broadcast data base 11, the series information producing section 51 describes the attribute 2 in the event information table of the sports relay broadcasting as shown in the event information tables of events 21 and 22 of FIG. 3, and describes the attribute 3 in the event information table of the sports news as shown in the event information table of event 23 of FIG. 3.

The broadcast receiving apparatus 20 expands the received program information in the memory, and displays the program information on the screen of TV monitor 26 in response to a user's operation or request. The reservation data entered by the user is entered to the reservation managing section 24. Then, the reservation managing section 24 performs the reservation processing of the designated program in accordance with the attribute of this program.

As a result, it becomes possible to store the latest news program only. Furthermore, it becomes possible to record all of drama programs belonging to the same series. It is also possible to record a sports relay broadcasting and deny the recording of the sports news to be broadcasted after this sports event.

According to the above-described embodiment, the program information is transmitted from the broadcast station to the receiving apparatus via a broadcasting satellite. However, the transmission of the program information to the receiving apparatus can be attained by using other methods. For example, it is possible to use another network to transmit the program information. The conventionally available recoding media, such as FD and DVD, can be used to transmit or store the program information.

As described above, this broadcast system makes it possible to make a reservation of a series of programs in various ways by changing the data format of the program information.

Second Embodiment

A second embodiment of the present invention provides a broadcast system allowing users to make a reservation for a spare program scheduled in the same time slot as a main program but whose broadcasting depends on uncertain factor such as weather. For example, a spare program for a sports program will be broadcasted only when this sports event is canceled due to bad weather.

Figure 4:
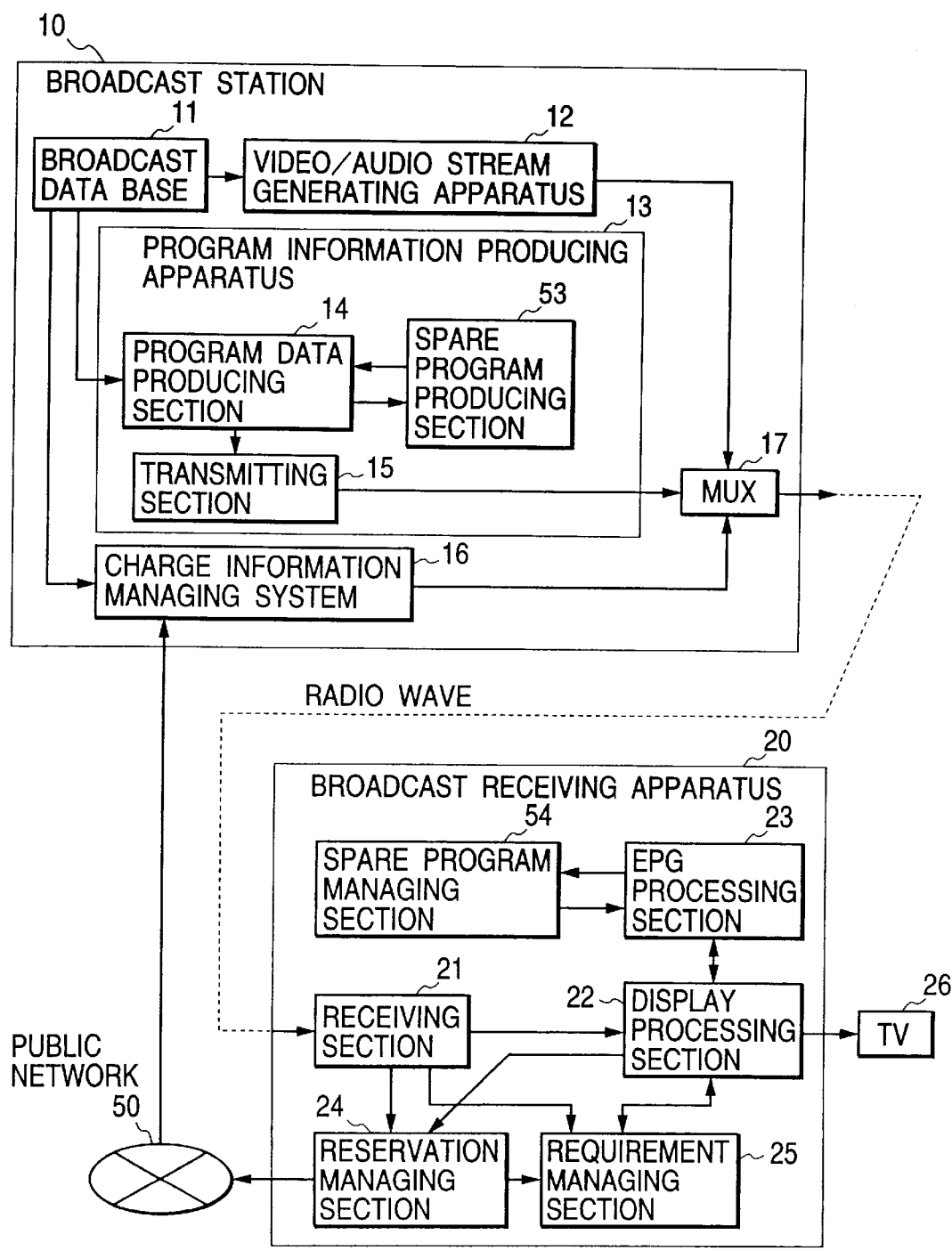
FIG. 4 is a block diagram schematically showing an arrangement of a broadcast system in accordance with a second embodiment of the present invention.

FIG. 4 shows a broadcast system of the second embodiment. In the broadcast station 10, the program information producing apparatus 13 includes a spare program producing section 53 which produces program information of a spare program, or program information of a main program related to this spare program. The broadcast receiving apparatus 20 includes a spare program managing section 54 which displays a program table including the spare program and the main program. The second embodiment differs from the above-described first embodiment in that the series information producing section 51 and the series information managing section 52 shown in FIG. 1 are replaced by the spare program producing section 53 and the spare program managing section 54. The rest of the second embodiment is substantially the same as the arrangement of the first embodiment.

FIG. 5 shows an event information table of a main program (event 1) and event information tables of related spare programs (events 2 and 3) produced by the spare program producing section 53 of the program information producing apparatus 13 based on the program scheduling information obtained from the broadcast data base 11 in the broadcast station 10.

Each event information table includes a broadcast flag and a spare flag in addition to a program name. The broadcast flag indicates as to whether this program will be actually broadcasted or not. The spare flag indicates as to whether this program has a spare program or whether this program is the spare program itself. A spare event ID is included to identify the spare program when any spare program is included.

The broadcast flag is "1" when the program will be surely broadcasted. As shown in FIG. 5, when no change is expected in the broadcast schedule, the broadcast flag "1" is allocated to the main program (event 1) and the broadcast flag "0" is allocated to the spare programs (event 2 and event 3). The spare flag "1" is allocated to the main program having any spare program, while the spare flag "2" is allocated to the spare programs. The spare flag "0" is allocated to the main program having no spare program. The event information table of the main program (event 1) having a spare flag "1" includes a spare event ID identifying the spare program.

The broadcast receiving apparatus 20 expands the received program information in the memory. The spare program managing section 54 produces a program table listing ordinary programs, main programs and related spare programs. The spare program managing section 54 displays a program table including information obtained from the event information table for an ordinary program when this ordinary program has a spare flag "0." When the main program (event 1) has a spare flag 1 and a broadcast flag "1", the spare program managing section 54 refers to the event information tables of the spare programs (event 2 and event 3) based on the spare event list. When each spare program has a broadcast flag "0", the spare program managing section 54 displays a program table including the event 1 as a main program and the events 2 and 3 as spare programs.

FIG. 7 shows an example of a program table displayed on the screen of TV monitor 26 based on the event information tables shown in FIG. 5.

In this manner, including spare programs on the displayed program table allows the user to make a reservation for a listed favorable spare program. In this case, it is possible to perform the reservation procedure for both of the main and spare programs scheduled in the same time slot. The result of the reservation procedure done by the user is notified to the reservation managing section 24.

If the events 2 and 3 are actually broadcasted due to cancellation of the broadcasting of the event 1, the spare program producing section 53 of the broadcast station 10 obtains the changed program scheduling information from the broadcast data base 11 and produces an event information table of the event 1 having a broadcast flag "0" and event information tables of the events 2 and 3 having a broadcast flag "1" as shown in FIG. 6.

The spare program managing section 54 of the broadcast receiving apparatus 20 receives these event information tables. When the event 1 (main program) has a broadcast flag "0", the spare program managing section 54 refers to the event information tables of the spare programs (event 2 and event 3) based on the spare event list. When each spare program has a broadcast flag "1", the spare program managing section 54 displays a program table including the events 2 and 3 only without listing the main program.

FIG. 8 shows a program table displayed on the screen of TV monitor 26 based on the event information tables shown in FIG. 6.

It is also preferable that the spare program managing section 54 describes only the event information tables of the events 2 and 3 when the broadcasting of the event 1 is canceled, describing no event information table relating to the event 1. In this case, the user can know the cancellation of the event 1 by comparing the new and old event information tables.

According to the example of this embodiment, there is a case where only the event 2 has a broadcast flag "1" and other events 1 and 3 have a broadcast flag "0." In such a case, no program will be broadcasted in the time slot from 20:00 to 21:00.

When the start time of a reserved program comes, the reservation managing section 24 refers to the event information table of the reserved program, and displays the reserved program as scheduled when its broadcast flag is 1. If the broadcast flag is "0" in the event information table of the reserved program, the display processing section 22 displays a message notifying the user of the cancellation of the reserved program, as shown in FIG. 9.

According to the above-described embodiment, the program information is transmitted from the broadcast station to the receiving apparatus via a broadcasting satellite. However, the transmission of the program information to the receiving apparatus can be attained by using other methods. For example, it is possible to use another network to transmit the program information. The conventionally available recoding media, such as FD and DVD, can be used to transmit or store the program information.

As described above, this broadcast system makes it possible to make a reservation of a spare program whose broadcasting is uncertain by changing the data format of the program information.

According to this embodiment, the spare programs are scheduled in the same time slot as the main program. However, there is a possibility that a spare program may be scheduled in a different time slot. Furthermore, the program table of FIG. 7 lists both the main program and the spare programs simultaneously. According to this embodiment, a similar program table will be used even when the main and spare programs are scheduled in different time slots.

Third Embodiment

A third embodiment of the present invention provides a broadcast system encouraging users to make a reservation for a PPV program by using a promotion program linked to the PPV program when this PPV program is on air.

Figure 10:
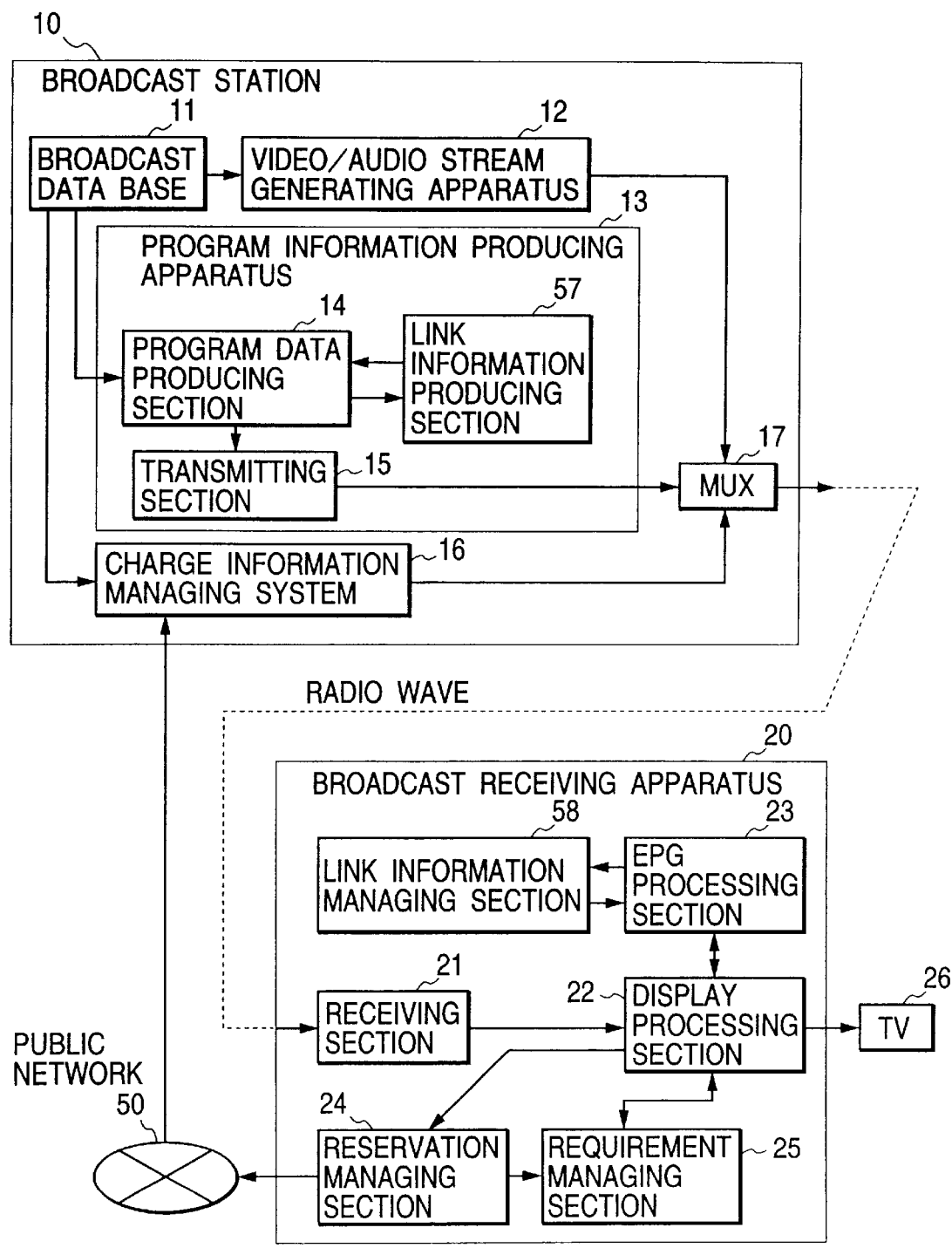
FIG. 10 is a block diagram schematically showing an arrangement of a broadcast system in accordance with a third embodiment of the present invention.

FIG. 10 shows a broadcast system of the third embodiment. In the broadcast station 10, the program information producing apparatus 13 includes a link information producing section 57 which produces program information relating to a subjective program and a linked program. The broadcast receiving apparatus 20 includes a link information managing section 58 which manages the link information correlating the subjective program with the linked program. The third embodiment differs from the above-described first embodiment in that the series information producing section 51 and the series information managing section 52 shown in FIG. 1 are replaced by the link information producing section 57 and the link information managing section 58. The rest of the third embodiment is substantially the same as the arrangement of the first embodiment.

According to this broadcast system, a PPV channel broadcasts a PPV program while a promotion channel broadcasts a promotion program introducing this PPV program. When the broadcast receiving apparatus 20 has no rights to receive this PPV program, the broadcast receiving apparatus 20 automatically tunes in to the promotion channel upon receiving the PPV program. When a purchasing procedure of this PPV program is done by the user who took a look at this promotion channel, the broadcast receiving apparatus 20 starts the display of the purchased PPV program.

Figures 11, 12:
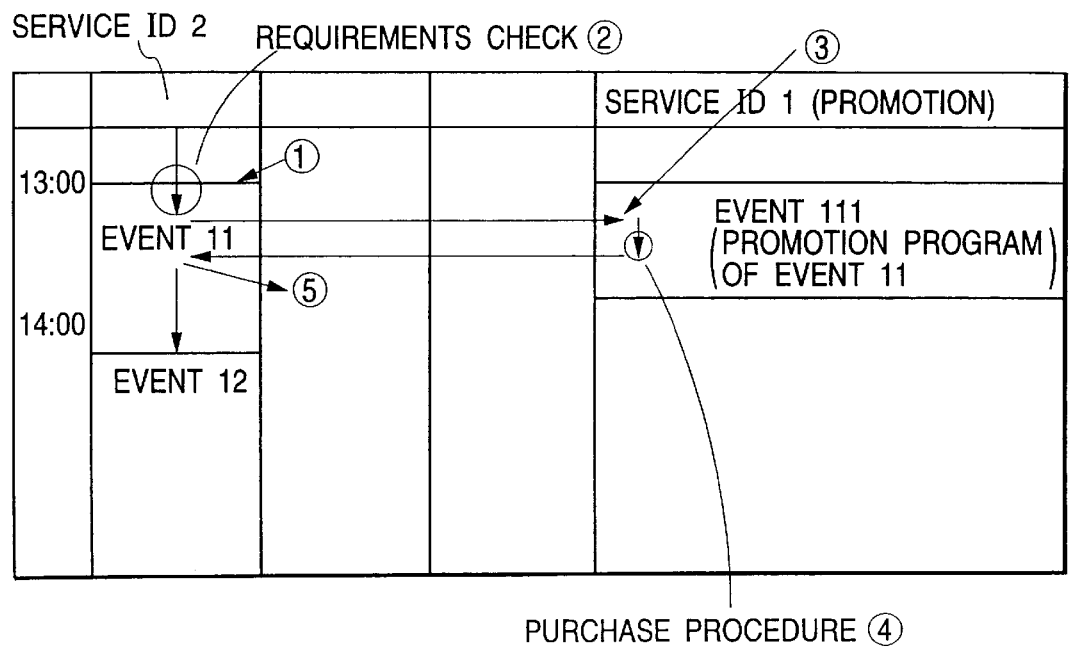
FIG. 11 is a view showing event information tables used in the broadcast system in accordance with the third embodiment of the present invention.
FIG. 12 is a view illustrating a switching operation of the viewing channel performed in the broadcast system in accordance with the third embodiment of the present invention.

FIG. 11 shows event information tables of a main program (event 11) and a event information table of its promotion program (event 111) produced by the link information producing section 57 of the program information producing apparatus 13 based on the program scheduling information obtained from the broadcast data base 11 in the broadcast station 10.

The event information table of the main program (event 11) describes a service ID (1) and an event ID (111) indicating the linked promotion program as well as the viewing requirements of the main program. The event information table of the promotion program (event 111) describes a service ID (2) and an event ID (11) indicating the linked main program.

The viewing requirements include an "age limit" item designating an allowable lower age of a viewer, a "PPV flag" representing a charged (1) or free (0) view, a contract type designating a one-month limit contract (2) in service unit, a contact (3) in program unit or the like, and a "price" item representing a price for each contract type.

The transmitting section 15 sends these event information tables to the MUX 17. After being multiplexed in the MUX 17, these event information tables are transmitted in the form of a TS signal to the broadcast apparatus 20.

The TS signal including these event information tables is demodulated in the receiving section 21 and decoded in the display processing section 22. The decoded event information tables are stored in the memory.

The broadcast receiving apparatus 20 performs a switching operation between linked channels based on the information contained in the received event information tables. FIG. 12 illustrates the details of the channel switching procedure performed in accordance with the order of encircled numbers.

In the broadcast receiving apparatus 20, after completion of one program, it is now assumed that a new program (event 11) is started at a timing ①. In response to this program change, the requirement managing section 25 obtains the viewing requirements described on the event information table of the event 11 via the EPG processing section 23, and compares the obtained viewing conditions of the event 11 with the registered viewer's data, such as age, reservation conditions, contract contents, etc. at a timing ②. When all of the viewing conditions are fulfilled, the viewing of the event 11 is allowed.

On the other hand, when the viewing conditions are not fulfilled due to incompletion of the purchasing procedure for this event 11, the requirement managing section 25 notifies the display processing section 22 of nonfulfillment of the viewing conditions. The display processing section 22 obtains the event ID (event 111) and the service ID (1) of the linked program, via the link information managing section 58 which refers to the event information table of the event 11. Then, based on the obtained data, the display processing section 22 displays an event 111, i.e., a promotion program of the event 11, on the TV monitor 26 at a timing ③.

A user, watching this promotion program, performs a purchasing procedure for this event 11 at a timing ④. The display processing section 22 sends the result of the purchasing procedure to the reservation managing section 24.

The reservation managing section 24 notifies the purchase acknowledgment to the requirement managing section 25 and the charge information managing system 16 of the broadcast station 10. The requirement managing section 25 notifies the display section 22 of fulfillment of the viewing conditions of the event 11. The display section 22 obtains the event ID (event 11) and the service ID (2) of the linked program, via the link information managing section 58 which refers to the event information table of the event 111. Then, based on the obtained data, the display processing section 22 starts displaying the event 11 on the TV monitor 26 at a timing ⑤.

According to the above-described embodiment, the program information is transmitted from the broadcast station to the receiving apparatus via a broadcasting satellite. However, the transmission of the program information to the receiving apparatus can be attained by using other methods. For example, it is possible to use another network to transmit the program information. The conventionally available recoding media, such as FD and DVD, can be used to transmit or store the program information.

As apparent from the foregoing description, this broadcast system prevents the uncomfortable blackout from appearing on the TV monitor screen when a PPV program is selected without fulfilling the viewing requirements. Instead, a promotion program introducing this PPV program is displayed. The broadcasting of this promotion program provides users a sufficient time to check the content of this PPV program before deciding to purchase it or not. During this procedure, the users can enjoy a continuous display from the promotion program to the PPV program.

Fourth Embodiment

A fourth embodiment of the present invention provides a broadcast system realizing a unique display for a program table.

Figure 13:
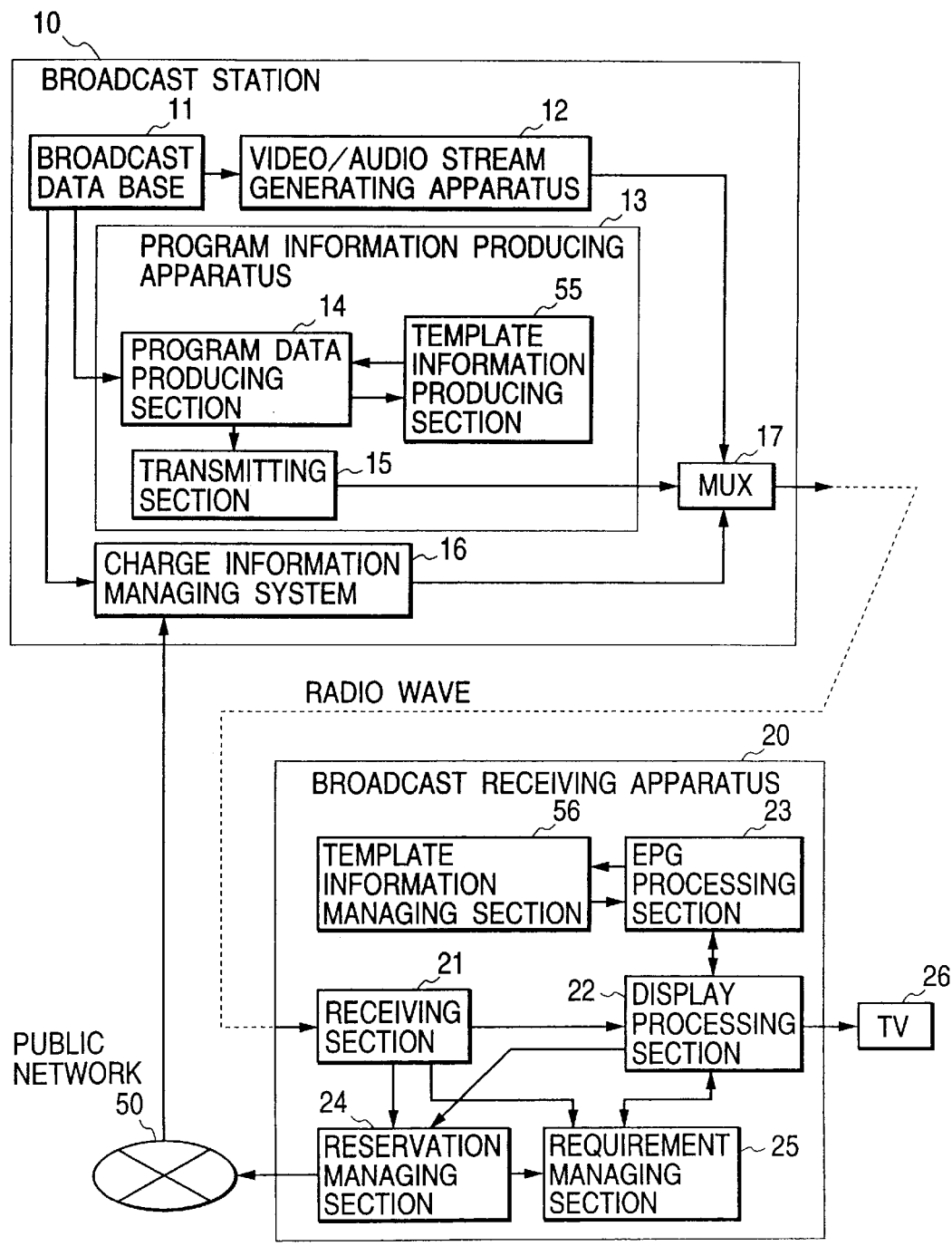
FIG. 13 is a block diagram schematically showing an arrangement of a broadcast system in accordance with a fourth embodiment of the present invention.

FIG. 13 shows a broadcast system of the fourth embodiment. In the broadcast station 10, the program information producing apparatus 13 includes a template information producing section 55 which designates a preferable template used in the display of a program table in each channel. The broadcast receiving apparatus 20 includes a template information managing section 56 which manages templates used in the display of the program table. The fourth embodiment differs from the above-described first embodiment in that the series information producing section 51 and the series information managing section 52 shown in FIG. 1 are replaced by the template information producing section 55 and the template information managing section 56. The rest of the fourth embodiment is substantially the same as the arrangement of the first embodiment.

In the broadcast station 10, the template information producing section 55 occasionally produces a template table describing a template used in the display of the program table. The produced template table is transmitted to the broadcast receiving apparatus 20. In the broadcast receiving apparatus 20, the template information managing section 56 stores each of the received templates or replaces an old template by a newly sent template according to the instruction involved in the template table. Thus, the template information managing section 56 stores a plurality of templates. The template may be a display soft or a setting file which describes a format peculiar to the display soft.

Figures 14, 15:
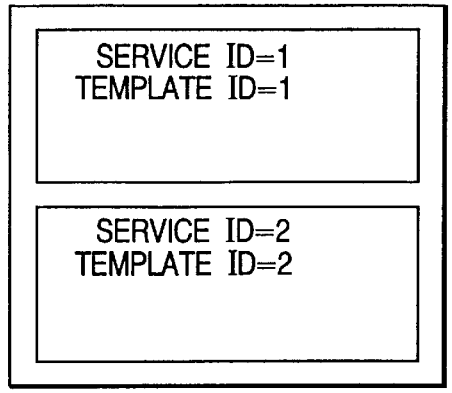
FIG. 14 is a view showing a service information table used in the broadcast system in accordance with the fourth embodiment of the present invention.
FIG. 15 is a view showing program tables used in the broadcast system in accordance with the fourth embodiment of the present invention.

FIG. 14 shows a service information table including a service ID identifying a service, produced by the template information producing section 55 of the broadcast station 10. This service information table is transmitted together with the program information to the broadcast receiving apparatus 20.

In the broadcast receiving apparatus 20, the EPG processing section 23 obtains the template ID of the service from the service information table, reads a template corresponding to this template ID from the template information managing section 56, and displays various program information (channel name, detailed information, performers etc.) of this service by using the template.

FIG. 15 shows two program tables which are differentiated from each other, wherein table (a) shows a program table used for a news channel, while table (b) shows a program table used for a music channel.

For example, it is preferable that the program table of the news channel has a calm color tone to display momentary news while the program table of the music channel has a colorful color tone and emphasizes users' concerning information, such as singers' names.

Regarding the templates stored in the template information managing section 56, it is possible to set a predetermined number of templates beforehand when the broadcast receiving apparatus 20 is shipped. In the broadcast section, it is preferable that the template information producing section 55 produces a template only when the present template needs to be changed or a new template is required and transmits the produced template to the broadcast receiving apparatus 20.

It is also possible to change the templates according to the preference of each enterpriser. If an enterpriser "A" has a plurality of services, it will be preferable to use a common template for each of these services to transmit a unified video of the enterpriser "A", thereby giving impression to viewers.

According to the above-described embodiment, the program information is transmitted from the broadcast station to the receiving apparatus via a broadcasting satellite. However, the transmission of the program information to the receiving apparatus can be attained by using other methods. For example, it is possible to use another network to transmit the program information. The conventionally available recoding media, such as FD and DVD, can be used to transmit or store the program information.

As apparent from the foregoing description, this broadcast system realizes the characteristic display of a program table differentiated for each program. According to this broadcast system, the broadcast receiving apparatus has a plurality of templates beforehand. The broadcast station transmits only the selection data for designating a preferable template, realizing an improved transmitting efficiency.

Fifth Embodiment

A fifth embodiment of the present invention provides a broadcast system wherein program information of all of terrestrial broadcasting services in addition to the program information of satellite broadcasting services and each receiving apparatus is allowed to selectively display necessary program tables.

Figure 16:
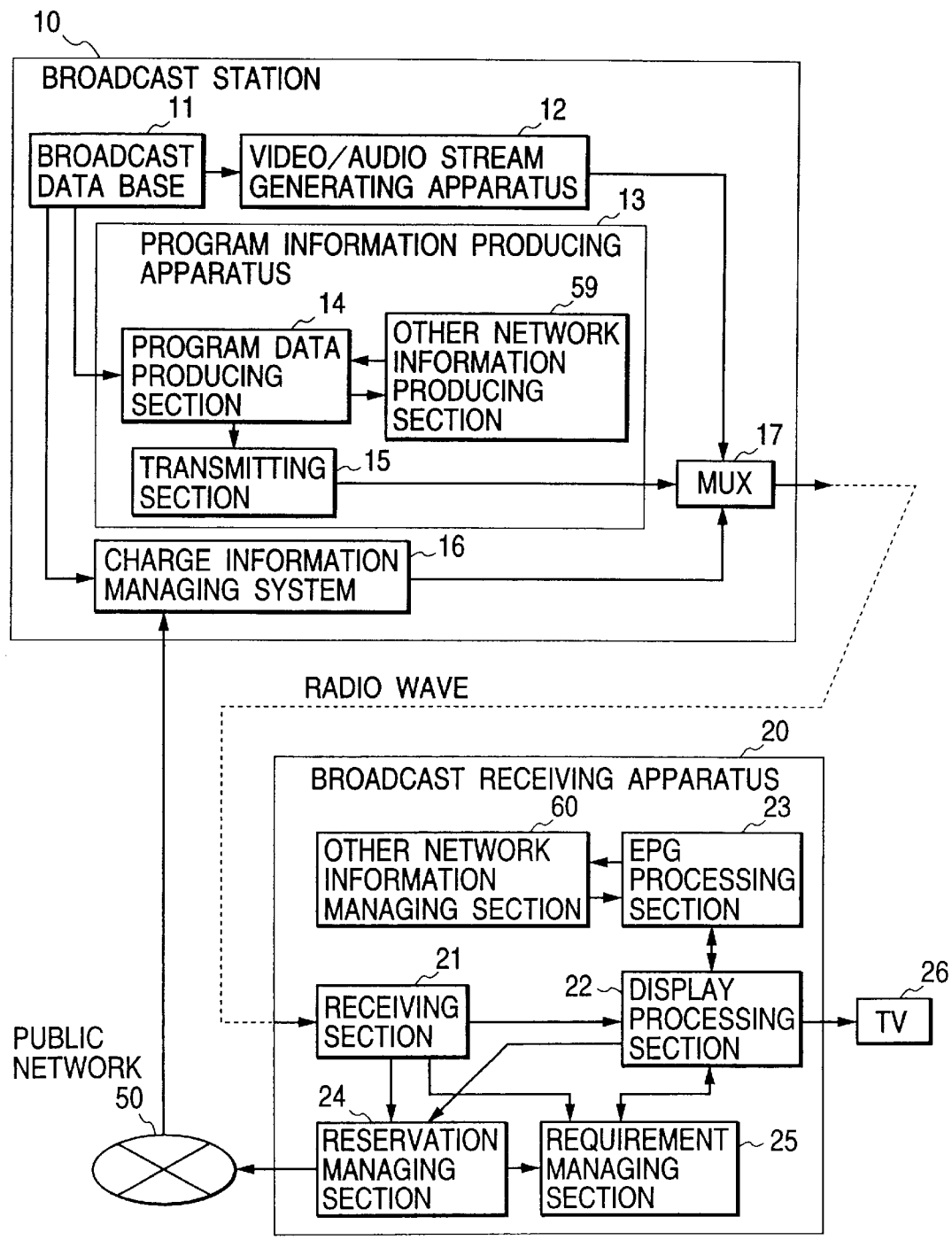
FIG. 16 is a block diagram schematically showing an arrangement of a broadcast system in accordance with a fifth embodiment of the present invention.

FIG. 16 shows a broadcast system of the fifth embodiment. In the broadcast station 10, the program information producing apparatus 13 includes an other network information producing section 59 which produces program information of other network. The broadcast receiving apparatus 20 includes an other network information managing section 60 which manages the display of program information of other network. The fifth embodiment differs from the above-described first embodiment in that the series information producing section 51 and the series information managing section 52 shown in FIG. 1 are replaced by the other network information producing section 59 and the other network information managing section 60. The rest of the fifth embodiment is substantially the same as the arrangement of the first embodiment.

In the broadcast station 10, the other network information producing section 59 produces program information of terrestrial broadcasting services in addition to the program information of the satellite broadcasting services produced by the program data producing section 14. FIG. 17 shows service information tables produced by the program data producing section 14 and the other network information producing section 59. Each service information table includes a network ID representing a network, a service ID identifying a service, a service name, and a region ID indicating a broadcast service area. The network ID is 1 for the BS network and 2 for the terrestrial network. A different region ID is assigned to each prefecture. The other network information producing section 59 produces service information tables covering terrestrial broadcasting services of all regions. Each service information table includes the corresponding region ID.

These service information tables are broadcasted from the broadcast station 10 and received by the broadcast apparatus 20.

The broadcast receiving section 20 expands the received service information table in the memory. The EPG processing section 23 performs the processing for listing all of service information having the same network ID 1. Thus, a program table for the satellite broadcasting services is displayed on the TV monitor screen through the display processing section 22.

When the service information has a network ID other than 1, the other network information managing section 60 compares the region ID included in its service information table with the region information registered in the receiving apparatus (being set by a user through a setting screen of the receiving apparatus). If the region ID agrees with the registered region information, the other network information managing section 60 performs the processing for listing this service information on the program table. The program table including the listed service information is displayed on the TV monitor screen through the display processing section 22. If the region ID disagrees with the registered region information, no information relating to this service information is listed on the program table.

FIG. 18 shows an example of a composite display simultaneously showing a program table listing BS channels and a program table listing local terrestrial TV channels.

According to the above-described embodiment, the program information is transmitted from the broadcast station to the receiving apparatus via a broadcasting satellite. However, the transmission of the program information to the receiving apparatus can be attained by using other methods. For example, it is possible to use another network to transmit the program information. The conventionally available recoding media, such as FD and DVD, can be used to transmit or store the program information.

As apparent from the foregoing description, this broadcast system makes it possible to display a program table listing local terrestrial TV channels in addition to the BS channels.

Sixth Embodiment

A sixth embodiment of the present invention provides a broadcast system wherein a priority order is put to each program information so as to adjust a transmission data amount or change the display frequency at the receiving apparatus in accordance with the priority order.

Figure 19:
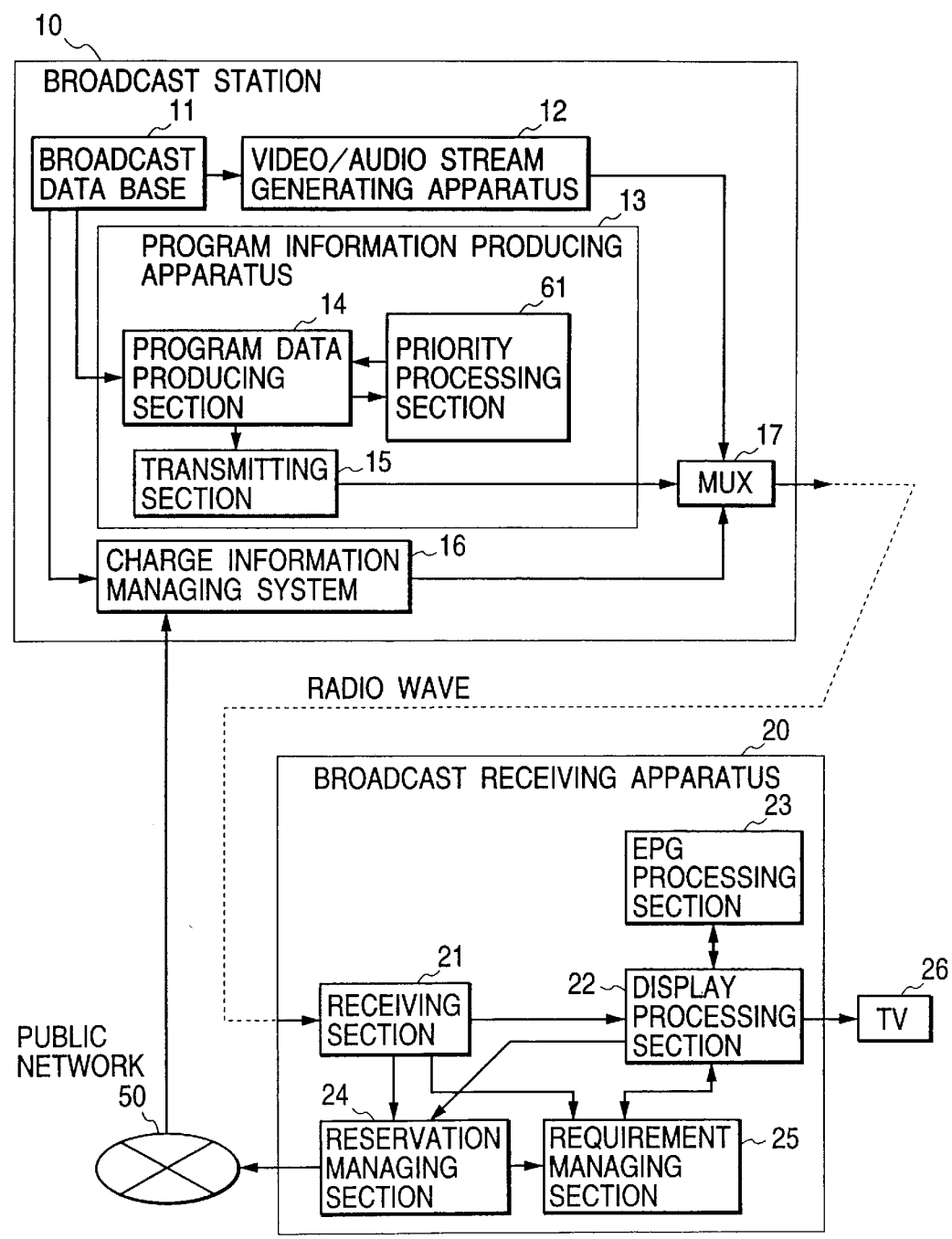
FIG. 19 is a block diagram schematically showing an arrangement of a broadcast system in accordance with a sixth embodiment of the present invention.

FIG. 19 shows a broadcast system of the sixth embodiment. In the broadcast station 10, the program information producing apparatus 13 includes a priority processing section 61 which changes the processing of the program information in accordance with the priority order allocated to the program information.

Figure 21:
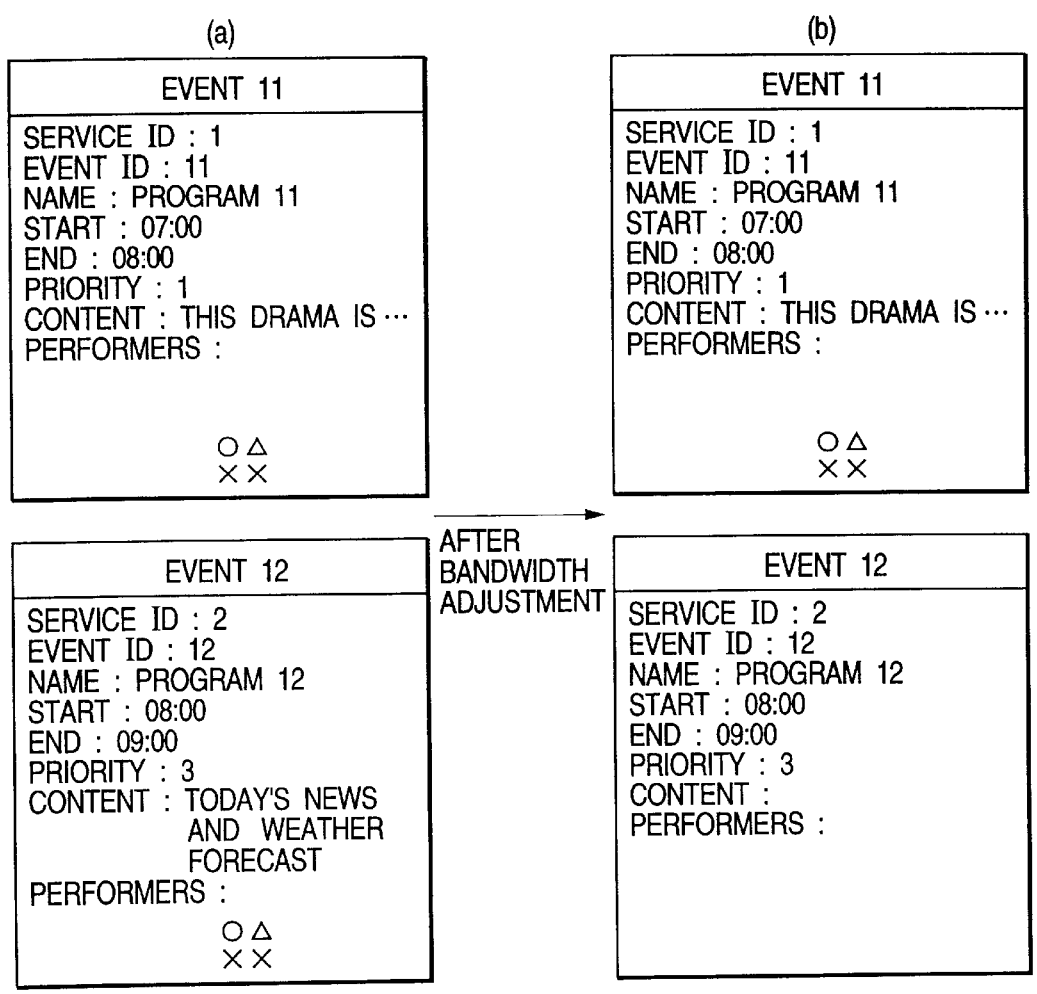
FIG. 21 is a view illustrating the modification of an event information table performed based on the priority in the broadcast system in accordance with the sixth embodiment of the present invention.

In the broadcast station 10, the program data producing section 14 produces an event information table of each event based on the program scheduling information obtained from the broadcast data base 11, as shown in (a) of FIG. 21. Each event information table describes a priority order of this program information in addition to service ID, event ID, start/end time, program content, and performers' names. The priority order is classified into three grades from 1 to 3. A default value for the priority order is set to 2, although an operator of the broadcast station 10 can manipulate a terminal to change the default value.

Figure 23:
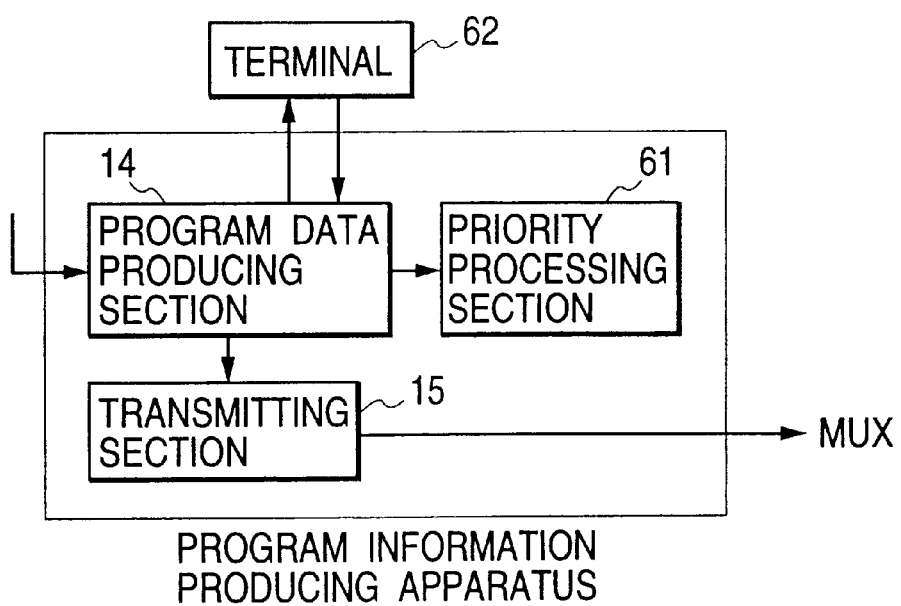
FIG. 23 is a block diagram schematically showing an arrangement of a priority order changing mechanism adopted in the broadcast system in accordance with the sixth embodiment of the present invention.

For example, in the broadcast station 10, the operator manipulates a terminal 62 to read the table information from the program data producing section 14 as shown in FIG. 23. Based on the readout table information, a service table is displayed on the screen of the terminal 62 (refer to (a) of FIG. 20). Next, the operator selects a preferable service from the displayed table to display the programs of the selected service (refer to (b) of FIG. 20). Then, the operator selects a program having a priority order to be changed. Upon operator's selection, the program information of the selected program is displayed on the terminal screen (refer to (c) of FIG. 20). The operator rewrites the priority order on the displayed screen.

For example, according to the event information tables shown in (a) of FIG. 21, the priority of event 11 is rewritten to 1 and the priority order of event 12 is rewritten to 3.

The program data producing section 14 sends each event information table including a priority order to the priority processing section 61. For each event information table, the priority processing section 61 performs the following processing with reference to the priority order.

A first method is applied to a "bandwidth adjustment" performed due to the lack of a transponder bandwidth, wherein the data amount of the program information is reduced to a reduced volume suitable to the available bandwidth. To this end, reduction of data amount of each program information is performed in accordance with the reverse order of priority. Thus, the lower-priority program information is reduced early. As shown in (b) of FIG. 21, the event information table is modified through the bandwidth adjustment. According to this embodiment, the event 11 of a high priority order (=1) keeps the data amount not changed. However, the event 12 (e.g., news program) of a low priority order (=3) has a reduced data amount for the program information, eliminating the "program content" and "performers' names." The transmitting section 15 sends the event information table to the broadcast receiving apparatus 20 via the MUX 17. In this case, the transmitted event information table includes no "priority order" item because the broadcast receiving apparatus 20 requires no priority data.

A second method performs reduction of the listing duration of each program information in accordance with the reverse order of priority when any bandwidth adjustment is required. For example, a standard listing schedule may start listing a program five days before the scheduled broadcast time and delete it upon completion of the broadcasting. According to the second method, a low-priority program is for example listed only three days before the scheduled broadcast time.

Figure 22:
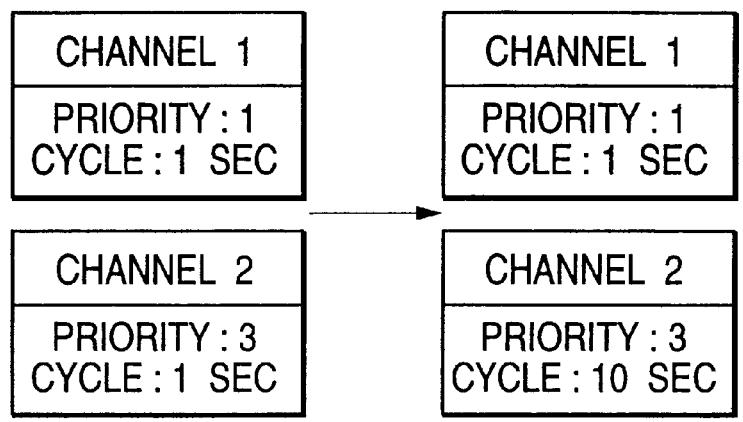
FIG. 22 is a view illustrating the modification of a cycle setting table performed based on the priority in the broadcast system in accordance with the sixth embodiment of the present invention.

A third method increases the frequency of display according to the priority order. High-priority program information is displayed at a high frequency, while low-priority program information is displayed at a low frequency. In the transmission of the program information from the priority processing section 61 to the transmitting section 15, the transmitting cycle is increased when the program information has a higher priority order and is reduced when the program information has a lower priority order. Thus, the broadcast receiving apparatus 20 frequently receives the high-priority program information and hardly receives the low-priority program information. This system lets a viewer have a chance to take a look at a program table of the high-priority program information. FIG. 22 shows an example of a cycle setting table and illustrates a way of changing the transmitting cycle according to the priority order.

It is possible to put a priority order to each service (channel) in addition to an event.

Furthermore, according to the first method, it is possible to put a priority order to an item itself of the program information to be erased. For example, the "program content" may have a priority order lower than that of the "performers' names" so that the "program content" is erased earlier than the "performers' names."

As apparent from the foregoing description, this broadcast system makes it possible to flexibly adjust the bandwidth or the frequency in the display in accordance with the priority order.

As apparent from the foregoing description, the broadcast system of the present invention makes it possible to make a reservation of each event of a series of programs after checking the content of its event.

Furthermore, a recording or a reservation of a series of programs can be performed automatically in accordance with the characteristics of these programs.

Furthermore, it becomes possible to make a reservation of a program, such as a spare program, whose broadcasting is uncertain.

Furthermore, the present invention presents the uncomfortable blackout from appearing on the TV monitor screen when a program is selected without fulfilling the viewing requirements. Instead, a promotion program introducing this PPV program is displayed. Thus, the users have a sufficient time to check the content of this PPV program before deciding to purchase it or not.

Furthermore, the program table of each channel or each program can be characterized and differentiated from others when displayed on the TV monitor screen.

Moreover, by putting a priority order to each program information, it becomes possible to flexibly adjust the bandwidth or the frequency in the display in accordance with the priority order.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A broadcast system for broadcasting a program of a broadcaster defined program group and related program information, comprising:

a program information producing apparatus for producing program information about at least one program of a series within said program group, said program information including at least one attribute designating a recording method for each program belonging to the same series;

wherein, when a plurality of programs belonging to the same series are to be recorded and/or viewed, means to enable a viewer to designate whether to automatically record said program or to automatically tune in to said program without recording it;

wherein, when the viewer designates recording of said program, the recording method designated by said attribute allows the viewer to select automatically recording of a program over a previously recorded program of the same series or automatically recording a program without erasing said previously recorded program of the same series; and a broadcast receiving apparatus for receiving said program and said program information produced by said program information producing apparatus and adapted to perform recording of the program in accordance with the attribute included in said program information designating the method of recording the program to be recorded.

2. A program information producing apparatus, for use when a broadcaster defines a program groups consisting essentially of:

a plurality of programs comprising:
program group information producing means for producing program information about at least one program of said program group constituting a series,
wherein said program information includes means to enable a viewer to decide whether to record a program or to tune in to said program without recording it; and,
where said viewer decides to record said program, said apparatus further including at least one attribute designating a recording method for each program belonging to the same series when a plurality of programs belonging to said same series are to be recorded,
wherein the recording method designated by said attribute enables a viewer to select automatically recording a program over a previously recorded program of the same series or automatically recording a program without erasing said previously recorded program of the same series; and
transmitting means for transmitting said program and program information produced by said program group information producing means.

* * * * *

UNITED STATES PATENT AND TRADEMARK OFFICE
CERTIFICATE OF CORRECTION

PATENT NO. : 6,751,401 B1
DATED : September 9, 2004
INVENTOR(S) : Yuko Arai

It is certified that error appears in the above-identified patent and that said Letters Patent is hereby corrected as shown below:

Column 24,
Line 37, change "groups" to -- group --

Signed and Sealed this

Twelfth Day of October, 2004

JON W. DUDAS
*Director of the United States Patent and Trademark Office*